July 7, 1925.

W. A. TURBAYNE 1,545,175

DYNAMO ELECTRIC MACHINE

Original Filed May 8, 1916    4 Sheets-Sheet 1

Witnesses
David H. Tinkler
Raeph Munden

Inventor
William A. Turbayne
By Raymond H. Van Nest
Attorney

July 7, 1925.
W. A. TURBAYNE
DYNAMO ELECTRIC MACHINE
Original Filed May 8, 1916  4 Sheets-Sheet 2
1,545,175
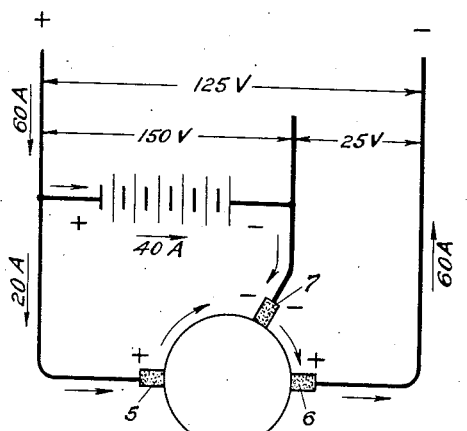
Fig. 2  60 Cells Charging
2.5 Volts Per Cell
80% Efficiency
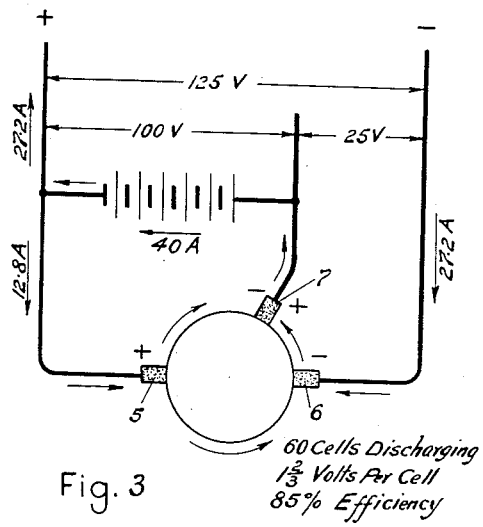
Fig. 3  60 Cells Discharging
1⅔ Volts Per Cell
85% Efficiency
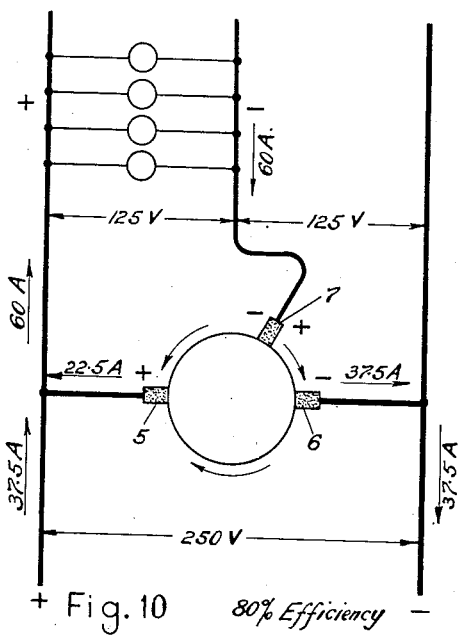
Fig. 10  80% Efficiency
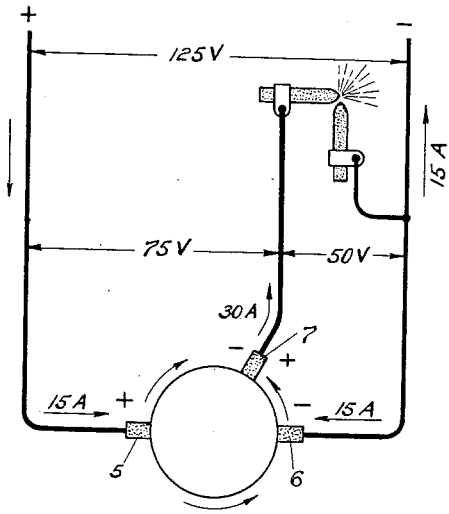
Fig. 11  80% Efficiency.
Witnesses
David H. Tinkler
Ralph Munden
Inventor
William A. Turbayne
By Raymond H. Van Nest
Attorney July 7, 1925.

W. A. TURBAYNE

DYNAMO ELECTRIC MACHINE

Original Filed May 8, 1916   4 Sheets-Sheet 3

1,545,175

Witnesses
David H. Tinkler
Ralph Munden

Inventor
William A. Turbayne
By Raymond H. Van Nest
Attorney

July 7, 1925.

W. A. TURBAYNE 1,545,175

DYNAMO ELECTRIC MACHINE

Original Filed May 8, 1916   4 Sheets-Sheet 4

Inventor
William A Turbayne
By Raymond H. Van West
Attorney

Witnesses
David H. Tinkler
Ralph Munden

Patented July 7, 1925.

1,545,175

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

Application filed May 8, 1916, Serial No. 96,091. Renewed November 1, 1923.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

This invention relates to dynamo-electric machines.

More particularly the present invention relates to that class of dynamo-electric machines in which there are combined in a single machine the functions and advantages of a motor-generator set. The invention relates to subject-matter disclosed in a co-pending application of the same applicant, Serial No. 40,837, filed July 20, 1915.

A motor-generator requires two dynamo-electric machines, one acting as a motor and the other as a generator. The motor is supplied with current from an external source and drives the generator, which may be independently regulated to deliver current of any desired value and at any voltage within the limits of capacity of the machine.

Attempts have been made heretofore to combine the functions of the motor and generator of a motor-generator set in a single direct current converter. In such machines, however, it has been impossible heretofore to obtain the same flexibility and range of regulation of output as may be obtained from the motor-generator. One machine has been proposed in which regulation of the output to a limited extent is obtained by distorting or shifting the field. This results in a variation of output, but only at the expense of efficiency. The field distortion necessarily affects the motor characteristics, and the weakened effect of the field causes dangerously high speeds. The range of variation of output is necessarily limited and it is impossible to obtain a wide variation or to obtain current values in either direction at will.

An object of the present invention is to provide a single dynamo-electric machine which may be driven from a direct current source and which will deliver a direct current which may be varied over wide ranges or reversed at will.

Another object of the invention is to provide a single dynamo-electric machine which may be driven from a direct current source and will, with equal efficiency, under all conditions, deliver a direct current which may be varied over a wide range or reversed at will.

Another object of the invention is to provide a single dynamo-electric machine of the above-mentioned class in which the major portion of the armature winding carries only the difference between the input and output currents, so that the conversion of electrical energy may be brought about within the machine under a high efficiency of operation.

Another object of the invention is to provide a single dynamo-electric machine of the above mentioned class requiring a minimum cross-section of copper.

A further object is to provide an electrical system employing the improved dynamo-electric machine above referred to.

Another object is to provide a construction in which the effects of armature reaction are substantially neutralized.

According to this invention, the dynamo-electric machine is provided with two distinct sets of field windings on the same field structure, setting up magnetizing fields that are superimposed. One set of windings creates a bipolar field in which the magnetic poles are 180 degrees apart, while the other set of field windings superimpose on this 180 degree bipolar field a bipolar field in which the magnetic poles are 120 degrees apart. A single armature winding of substantially 120 degree pitch, co-operates with these two fields. A pair of brushes arranged substantially 180 electrical degrees apart are connected to an external circuit. A third brush is provided which may be connected with either or both of the first mentioned brushes through an external circuit or circuits. One field may be varied independently of the other. Though the machine will be described as having a bipolar field superimposed on another bipolar field, it will be obvious that the number of fields may be multiplied as desired, so long as the electrical and magnetic relations are maintained.

Referring to the drawings:

Figures 2 and 3 represent an application of the present invention to a system wherein a storage battery is used in connection with constant voltage mains, said figures showing, respectively, the battery absorbing energy from the mains and the battery restoring energy to the mains.

Figure 10 represents an application of the present invention as a balancer in a three-wire system.

Figure 11 represents an application of the present invention wherein the dynamo-electric machine serves to step down a comparatively high electromotive force to a lower value.

Figure 1:
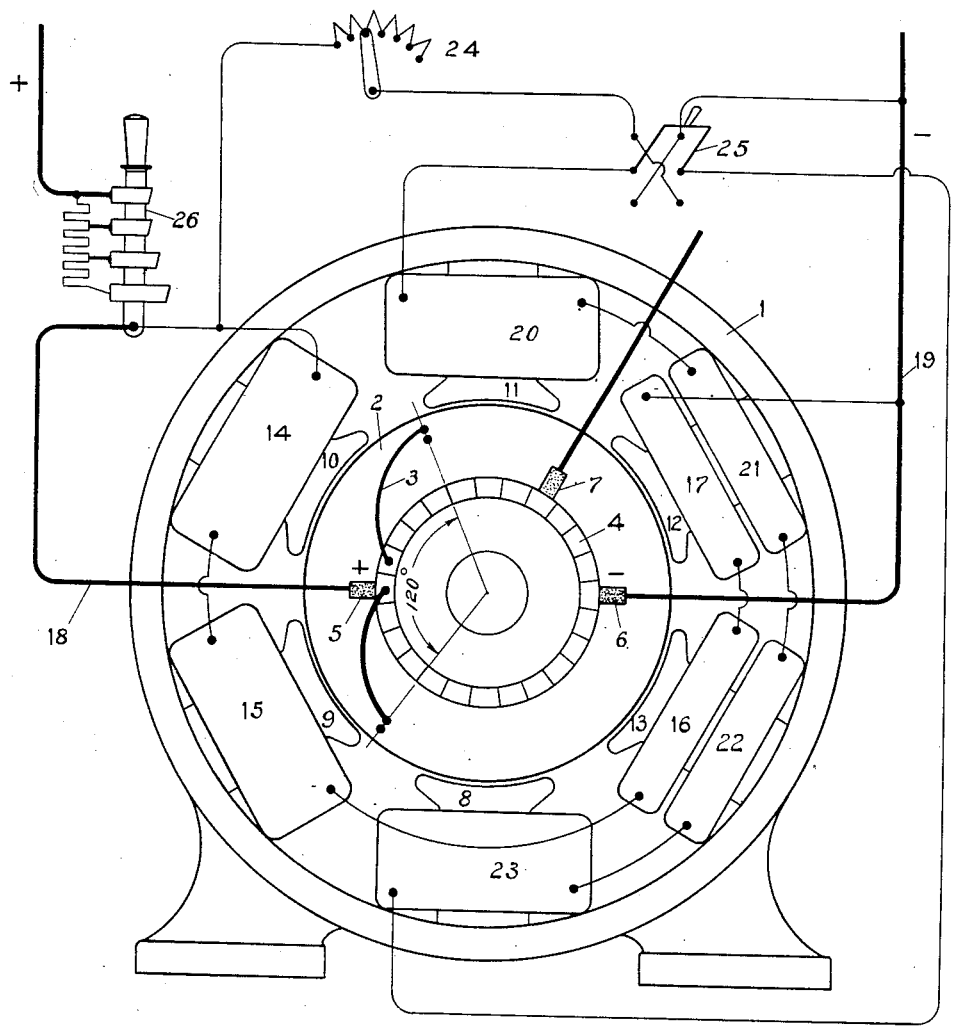
Figure 1 represents a dynamo-electric machine according to the present invention.

Referring to Fig. 1, the numeral 1 indicates the field frame and the numeral 2, the armature of the dynamo-electric machine according to the present invention. The armature is provided with conductors 3, arranged to form coils. These coils are given substantially 120 electrical degree pitch. The ends of each coil are connected by symmetrically arranged conductors to adjacent commutator bars of the commutator 4. Figure 1 illustrates one coil, but, of course, additional coils are distributed about the armature. The 120 degree pitch is selected since such a winding is found to be equally effective when driven in a field in which the opposite effective magnetic poles are arranged 180 degrees apart or in which opposite poles are arranged 120 degrees apart.

Bearing on the commutator 4 are three brushes 5, 6 and 7. Brushes 5 and 6 are arranged 180 degrees apart and brush 7 is arranged about 60 degrees from brush 6.

The field frame has six poles, 8, 9, 10, 11, 12 and 13, symmetrically arranged. Poles 9, 10, 12 and 13 are provided with field coils 14, 15, 16 and 17 respectively connected in series across the conductors 18 and 19 leading to the brushes 5 and 6 respectively. Poles 11, 12, 13 and 8 are provided with field coils 20, 21, 22 and 23 respectively, also connected across conductors 18 and 19. Thus poles 8, 9, 10 and 11 each have a single winding, while poles 12 and 13 are provided each with two windings, one included in each set of windings. A field rheostat 24 is provided for adjusting the current strength in coils 20, 21, 22 and 23, and a pole changing switch 25 is provided for reversing the direction of current in said set of windings. The windings are so disposed on the field poles that upon the passage of field current therethrough, poles 9 and 10 will be of like polarity, for example, south poles, while poles 12 and 13 will be of the opposite polarity, or north poles, so that with these poles so excited, there is in effect a symmetrical bipolar machine with magnetic flux passing along an axis in line with the center of the spaces between poles 9 and 10 and 12 and 13 respectively. Brushes 5 and 6 are disposed in line with this flux axis. Also, windings 20, 21, 22, and 23 are so disposed on the field poles that upon the passage of field current therethrough, poles 11 and 12 will be of like polarity, for example, north poles, while poles 13 and 8 will be of the opposite polarity, or south poles. This provides, in effect, a bipolar structure with the mean axes disposed at an angle of 120 degrees and respectively in line with the spaces between poles 11 and 12 and poles 13 and 8. Brush 7 is arranged in line with one of these axes. By manipulation of the exciting current in coils 20, 21, 22 and 23, the voltage effective in brush 7 may be varied with reference to the voltage on the horizontal brushes 5 and 6 in any desired degree. A multiple contact starting switch 26 is provided for starting the device as a motor on the supply circuit 18, 19.

In starting this device, the operator will connect the horizontal brushes and their field windings 14, 15, 16 and 17 to the source of supply, utilizing the starting switch 26 for this purpose. The work circuit may be connected across 5 and 7 or 6 and 7, or work circuits may be connected across both these combinations of brushes.

Figure 4:
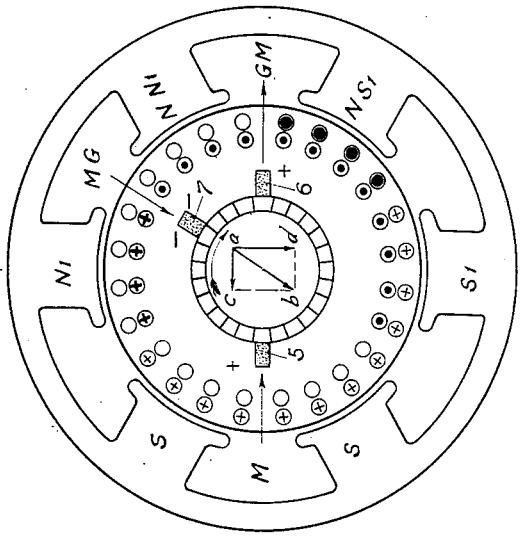
Figures 4, 5 and 6 represent, schematically, the conditions existing within the machine when a storage battery is being charged from a constant voltage line, as shown in Figure 2.
Figure 5:
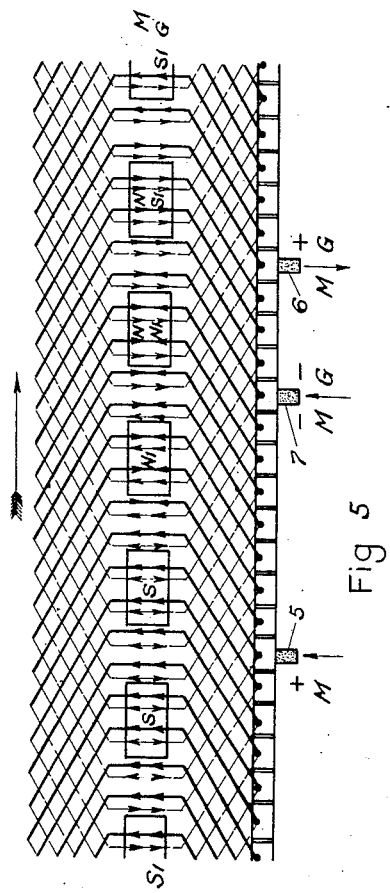

Proceeding now to a description of a few of the practical applications of the present invention, Figure 2 illustrates the conditions existing when a storage battery of 60 cells is charged at the rate of 40 amperes and 2.5 volts per cell from a direct current source of 125 volts at an assumed efficiency of conversion of 80 per cent. This necessitates that the voltage across brushes 5 and 7 be raised to 150, while a voltage of 25 in opposition thereto is developed across brushes 7 and 6, the algebraic sum of these two opposing voltages equalling that of the line, namely, 125 volts. With 60 amperes flowing from the line, 40 amperes pass through the battery at the increased voltage. This current of 40 amperes enters the machine at brush 7 and leaves at brush 6 in combination with 20 amperes which pass from the line through brush 5. The current will be distributed in the various armature conductors according to the difference in the resistance offered. The major part of the 60 amperes flowing from brush 6 to the line, will flow only in one-sixth of the conductors, to wit, those located between brushes 7 and 6, while considerably lower currents will flow in the remaining five-sixths of the conductors. The direction of currents in the armature conductors, the polarity of the field structure and the distribution of voltage around the commutator for this condition of operation are illustrated in Figures 4, 5 and 6.

Figure 6:
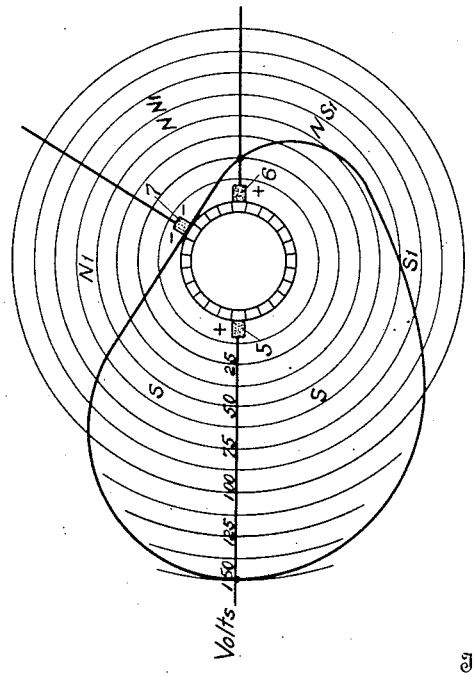

Due to the superposed fields, a distribution of voltage may be obtained around the commutator indicated by the polar diagram, Figure 6, from which it will be noted that an effective voltage of 150 exists across brushes 5 and 7, while an opposing voltage of 25 is effective across brushes 6 and 7, the resultant voltage of 125 being effective across brushes 5 and 6. The direction of current in the various armature conductors is illustrated in Figure 5. The upper row of arrows indicates the direction of the current in the armature conductors performing the motor function, while the lower row of arrows indicates the direction of current in the conductors which perform the generator function. It will be noted that in certain of the conductors the sum of these two currents will flow, while in others, only the difference will flow and under certain conditions of operation this difference may be zero. In Figure 4 the armature conductors carrying the sum of the two currents, are indicated by the crosses and dots, while those carrying the difference are left blank. The crosses and dots are used conventionally to indicate respectively that the current is flowing away from the observer and toward the observer. Under the conditions of operation illustrated in Figure 2, the conductors connected with the commutator segments lying between the brushes 5 and 7, carry the difference between the motoring and generating currents above referred to. This difference, for the purpose of simplifying this explanation, is taken to be equal to zero. These conductors are accordingly indicated in blank. The four inside conductors under pole N, and the four outside conductors under pole NS, carry the major portion of the current flowing from brush 6 and are marked with heavy crosses and dots. The remaining portion of the conductors cary a minor part of the current flowing from the brush 6 and are indicated by light crosses and dots.

The small vector diagram within Figure 6 shows that the armature currents have substantially no tendency to distort the flux axis and that, therefore, the armature reactions are substantially neutralized. The diagonal vector a—b illustrates the general direction of the resultant magnetizing force imparted by the effective armature conductors, this magnetizing force being substantially in line with that furnished by the excited external poles. This diagonal vector may be resolved into two vectors a—c and a—d at right angles, the vector a—c acting along the horizontal line having a tendency with increase of load, to cause reduction in the speed of the device, which, however, is compensated for by the downward magnetizing force which gives a compounding action tending to increase the flux effective on brush 5.

Figure 7:
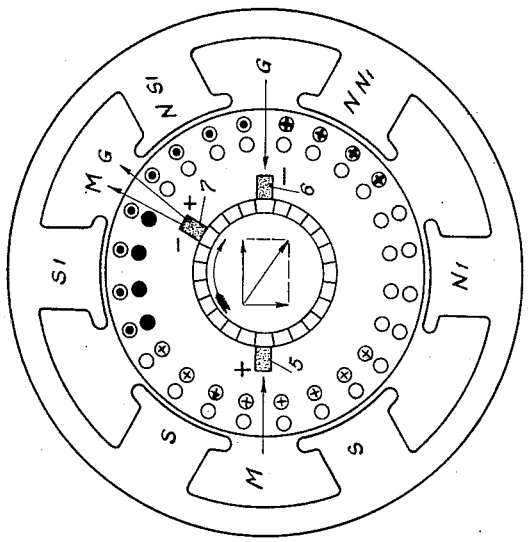
Figures 7, 8 and 9 represent conditions existing within the machine when the storage battery is restoring energy to the line, as shown in Figure 3.
Figure 8:
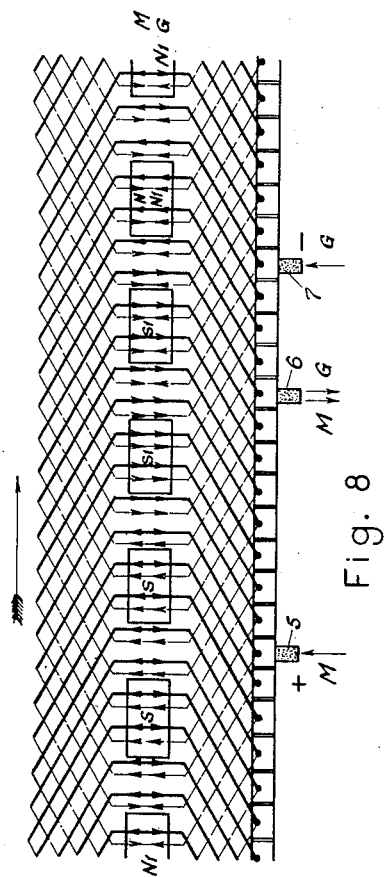
Figure 9:
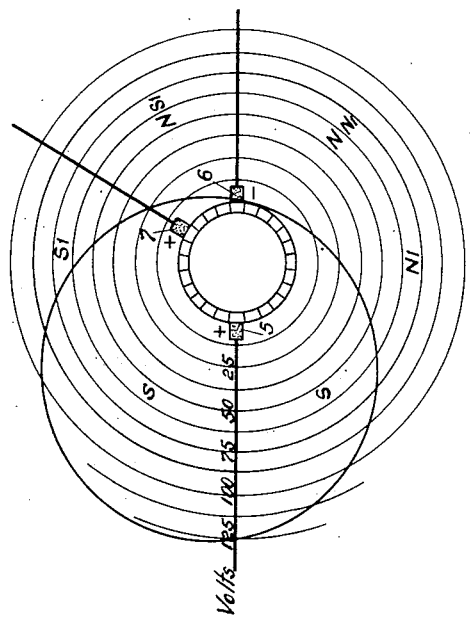

Figure 3 illustrates the conditions when the same battery, considered above, is restoring energy to the mains, discharging at a 40 empere rate at 1⅔ volts per cell with an efficiency of conversion of 85 per cent. Under this condition of operation, the battery furnishes the energy to drive the machine and in the process of conversion 27.2 amperes are delivered back to the original source of supply. It will be noted that with the battery thus discharging the 40 emperes, only 12.8 amperes pass through brush 5 through the armature windings connected between brushes 5 and 7 and 5 and 6. The 27.2 amperes delivered to the original source enters brush 6, while the 40 amperes passing through brush 7 to the battery circulate in the armature conductors embraced in the short section between brushes 6 and 7. The direction of currents in the armature conductors, the direction of the excitation of the magnet poles and the distribution of potential around the commutator under this condition of operation, are illustrated in Figures 7, 8 and 9. From the polar diagram, Figure 9, it will be noted that 100 volts are effective across brushes 5 and 7 by reason of the fact that 25 volts are developed across brushes 6 and 7 through the action of the superposed flux. Figure 8 illustrates the direction of currents in the armature conductors under this condition of operation, while Fig. 7 gives the direction of the magnetizing forces imparted by the current in these armature conductors. It will be noted by the vector diagram within Fig. 7 that under this condition of operation, the armature exerts a magnetizing force substantially in opposition to that imparted by the field poles. The horizontal component of this magnetizing force, however, tending to increase the speed of the device, is counteracted by the vertical magnetizing component which tends to reduce the flux effective on brush 7, so that the increased speed of the device has no tendency to disturb the ratio between the input and output currents.

As illustrated in Fig. 10, the present invention will operate very efficiently as a three wire balancer, either to maintain a balanced condition on two halves of a three-wire circuit, or to develop a three-wire circuit from a two-wire source. This figure discloses a three-wire system of 125 volts per side, developed on an original two-wire system of 250 volts, a total load of 60 amperes at 125 volts existing on one half of the system only. Even under this extremely unbalanced condition, only 22.5 amperes flow through the major portion of the armature winding embraced between brushes 5 and 7 and 5 and 6, which with the 37.5 amperes furnished by the two-wire line, makes up the 60 amperes demanded by the load, this current of 60 amperes returning through the neutral conductor traversing only the small portion of the armature winding embraced between brushes 6 and 7.

Figure 11 illustrates the conditions existing when a low voltage high current circuit is supplied from a source of higher voltage. This figure illustrates an arc lamp supplied with 30 amperes at 50 volts pressure supplied from a 125 volt source. Fifty per cent of this current, or 15 amperes, is directly supplied from the line, while the remaining 15 amperes are supplied by the machine, this current combining with the 15 ampere line current at brush 7 and returning to the machine at brush 6. The dynamo-electric machine embodied in the present invention may be effectively and efficiently employed to supply arc lamps such as are employed in moving picture projectors or to supply a comparatively heavy current at suitable voltage for arc welding operations.

One embodiment of the present invention and a few practical applications of the same have been described in detail. Many modifications will occur to those skilled in the art. It is desired to cover in this case all such modifications that fall within the scope of the invention as defined by the appended claims.

Having described my invention, what I claim as new and desire to secure by Letters Patent of the United States is:—

1. A dynamo electric machine adapted for use as a direct current converter having a single armature and a plurality of field poles adapted to be energized to set up distinct superposed bipolar fields of flux, one of said fields of flux threading said armature diametrically, the other of said fields of flux threading said armature along radii spaced 120 degrees apart, said radii being symmetrically located relative to said diametrical field of flux, said armature being provided with windings of substantially 120 electrical degree pitch, a pair of diametrically opposed brushes adapted to supply current to said armature for motoring purposes, and a third brush adapted to be connected with one of said pair of brushes to supply an outside circuit.

2. A dynamo electric machine having a single armature, field coils for setting up a bipolar field threading said armature diametrically, and a superposed bipolar field threading said armature along radial axes spaced 60 degrees on either side of said diametrical path, three brushes co-operating with said fields operative in sets of two, one set being operative to receive current while the other set is operative at the same time to deliver current, one set of brushes being spaced substantially 180 electrical degrees apart and the other set being spaced substantially 120 electrical degrees apart.

3. A dynamo electric machine having a single armature, field coils for setting up a bipolar field threading said armature diametrically, and a superposed bipolar field threading said armature along radial axes spaced 60 degrees on either side of said diametrical path, three brushes co-operating with said fields operative in sets of two, one set being operative to receive current while the other set is operative at the same time to deliver current, said armature being provided with a winding of substantially 120 electrical degree pitch, one set of brushes being spaced substantially 180 electrical degrees apart and the other set being spaced substantially 120 electrical degrees apart.

4. A dynamo-electric machine having a single armature and a plurality of field windings, certain of said windings being adapted to direct flux along axes spaced $n$ degrees apart, certain other of said windings being adapted to direct flux along axes spaced $\frac{2n}{3}$ degrees apart, three brushes co-operating with said armature, two of which are connected to conductors of said armature lying substantially in the axes of flux produced by the first mentioned field windings and the other of which is connected to conductors of said armature lying substantially in an axis of the flux produced by said other windings.

5. In a dynamo-electric machine, a field structure having polar means, coil means for magnetizing said polar means, a pair of polar projections spaced 180 electrical degrees from said polar means, coil means for magnetizing said polar projections oppositely to said first mentioned means, other polar projections each provided with coil means to magnetize same oppositely to each other, said last mentioned polar projections being spaced on either side of said polar means between said polar means and said first mentioned polar projections, each of said first mentioned polar projections having other coil means for setting up a magnetizing effect similar in sense to the adjacent second mentioned polar projection, an armature co-operating with said field structure having a 120 electrical degree pitch and a pair of brushes commutating conductors between said polar means and said second mentioned polar projections and between said second mentioned polar projections and said first mentioned polar projections, an electrical circuit connected to said brushes, a third brush commutating a conductor lying between said first mentioned polar projections and a conductor lying between said polar means and one of said second mentioned polar projections and an electrical circuit connected between said last mentioned brush and one of said pair of brushes.

6. A system comprising an input circuit, a dynamo-electric machine and an output circuit, said dynamo electric machine having a single armature and a field structure provided with a plurality of poles with means for energizing said poles to provide a pair of independently controllable fields, a pair of brushes connecting with said armature at points of maximum potential difference due to armature rotation in one of said fields, said armature having a winding pitch of 120 electrical degrees relative to said one field and a third brush located 120 degrees from one of said first mentioned brushes, one of said circuits being connected across said first mentioned brushes, the other of said circuits being connected between said third brush and one of said first mentioned brushes.

In witness whereof, I have hereunto subscribed my name.

WILLIAM A. TURBAYNE.